US010823580B2

(12) United States Patent
Ahlbrecht et al.

(10) Patent No.: US 10,823,580 B2
(45) Date of Patent: Nov. 3, 2020

(54) INSPECTION OF A NAVIGATION AID

(71) Applicant: Honeywell International Inc., Morris Plains, NJ (US)

(72) Inventors: Mark A Ahlbrecht, Champlin, MN (US); Rod Stangeland, Plymouth, MN (US); Jeffrey E. Love, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 302 days.

(21) Appl. No.: 15/953,833

(22) Filed: Apr. 16, 2018

(65) Prior Publication Data

US 2019/0226870 A1  Jul. 25, 2019

Related U.S. Application Data

(60) Provisional application No. 62/619,308, filed on Jan. 19, 2018.

(51) Int. Cl.
*G01C 23/00* (2006.01)
*G08G 5/00* (2006.01)
*G01S 19/23* (2010.01)
*G01S 1/14* (2006.01)

(52) U.S. Cl.
CPC ............ *G01C 23/00* (2013.01); *G01S 1/14* (2013.01); *G01S 19/23* (2013.01); *G08G 5/0047* (2013.01)

(58) Field of Classification Search
CPC ........... G01C 23/00; G01S 1/14; G01S 19/23; G08G 5/0047
USPC ........................................................ 701/534
See application file for complete search history.

(56) References Cited

U.S. PATENT DOCUMENTS

| 5,781,151 A | 7/1998 | Stratton |
| 6,226,591 B1* | 5/2001 | Okumura ............... G01C 21/28 |
| | | 701/409 |
| 2003/0149528 A1* | 8/2003 | Lin ....................... G01C 21/165 |
| | | 701/472 |
| 2006/0167643 A1* | 7/2006 | Casto ................... G01R 35/005 |
| | | 702/85 |
| 2016/0061627 A1* | 3/2016 | Tan ........................... G07C 5/00 |
| 2017/0116865 A1 | 4/2017 | Mullin |

FOREIGN PATENT DOCUMENTS

| WO | 1995010051 A1 | 4/1995 |
| WO | 2017083430 A1 | 5/2017 |

* cited by examiner

*Primary Examiner* — Gertrude Arthur Jeanglaude
(74) *Attorney, Agent, or Firm* — Fogg & Powers LLC

(57) ABSTRACT

A method of inspecting a navigation aid, the method comprising: receiving navigation data relating to the navigation aid from a plurality of vehicles; statistically analyzing the received navigation data; determining the accuracy of the navigation aid based on the statistically analyzed navigation data; and calibrating the navigational aid based on the determined accuracy of the navigation aid.

20 Claims, 4 Drawing Sheets

INSPECTION OF A NAVIGATION AID

PRIORITY CLAIM

This Application claims priority to U.S. Provisional Patent Application Ser. No. 62/619,308, filed Jan. 19, 2018, having the same title herewith, the contents of which is herein incorporated by reference.

BACKGROUND

In commercial aviation, navigation aids like the Instrument Landing System (ILS), Distance Measuring Equipment (DME), VHF Omni-directional Range (VOR), and others are provided by a Navigation Service Provider (NSP) to support navigation operations in a region. All of these navigation aids require periodic inspection by the NSPs to ensure that the navigation aid is operating properly throughout its service volume. These systems can develop errors like constant offsets (for example, biases) or inaccurate measurements (for example, dispersion).

To perform this inspection, the NSP typically employs one or more aircraft equipped with very high accuracy equipment that periodically inspects the navigation aid to determine whether the navigation aid is functioning properly. This equipment can include survey grade Global Positioning Systems, high grade inertial reference systems, to mention a few. Performing these inspections are very costly for the NSP organization and may disrupt operational traffic. In addition, operating the specially equipped aircrafts may often require a specifically trained crew. Thus, these aircrafts are expensive to operate in capital costs, labor costs, and equipment costs. Further, because of the costs associated with the specially equipped aircraft and crew, the navigation aid is typically only inspected at an interval of approximately 6 months.

For the reasons stated above and for other reasons stated below, it will become apparent to those skilled in the art upon reading and understanding the specification, there is a need in the art for less expensive methods and systems for inspection of the navigation aid.

SUMMARY

The following summary is made by way of example and not by way of limitation. It is merely provided to aid the reader in understanding some of the aspects of the subject matter described. Embodiments provide a system and methods for an inspection of a navigation aid.

In one example embodiment, A method of inspecting a navigation aid is provided. The The method comprises: receiving navigation data relating to the navigation aid from a plurality of vehicles, wherein the navigation data includes measurement of at least one parameter; statistically analyzing the received navigation data; determining the accuracy of the navigation aid based on the statistically analyzed navigation data; and calibrating the navigational aid based on the determined accuracy of the navigation aid.

In another example embodiment, a navigation aid inspection system is provided. The navigation aid system comprises: a data center in communication with at least one communication link to receive navigation data relating to the navigation aid from a plurality of vehicles, the data center including: at least one memory to store at least operating instructions and navigation data received from the plurality of vehicles, at least one processor configured to execute the operating instructions to statistically analyze the received navigation data; determine the accuracy of the navigation aid based on the statistically analyzed navigation data; and cause a calibration of the navigation aid when the determined accuracy of the navigation aid is beyond a set threshold to achieve a desired accuracy.

In yet another example embodiment, a non-transitory computer readable medium storing a program having instructions stored thereon, executable by a processor, to perform a method for inspection of a navigation aid, the method comprising: receiving navigation data relating to the navigation aid from a plurality of vehicles, wherein the navigation data includes measurement of at least one parameter; statistically analyzing the received navigation data; determining the accuracy of the navigation aid based on the statistically analyzed navigation data; and calibrating the navigational aid based on the determined accuracy of the navigation aid.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
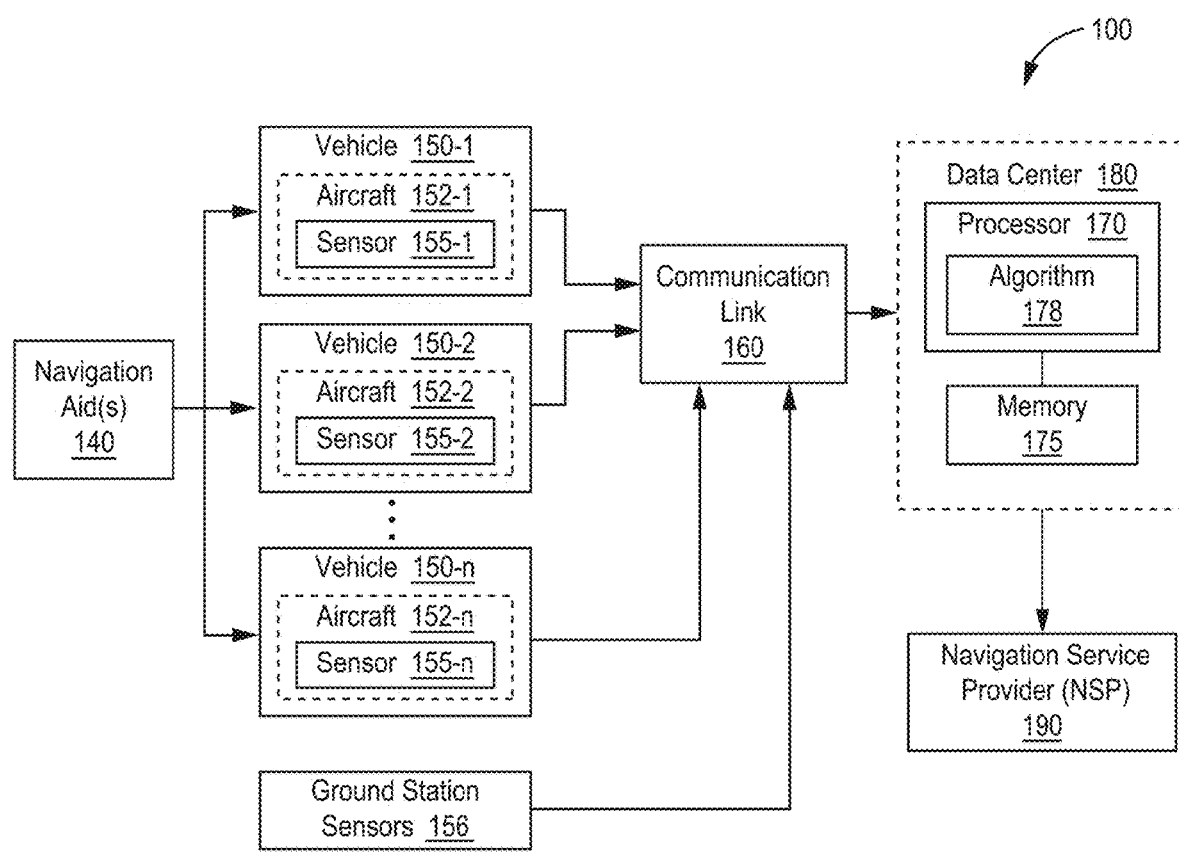
FIG. 1 illustrates an example of a system for inspection of a navigation aid according to the embodiments described herein.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present description provide systems and methods for inspection of a navigation aid. The embodiments described herein use distributed, remote sensor sampling to inspect aircraft navigation aids without the use of flight test aircraft, staff, or expensive equipment. The system described in the embodiments herein utilize the navigation sensors that are already contained on commercial vehicles, such as, commercial aircrafts, as well as associated ground equipment and mechanism to collect and analyze that data.

Independent samples of the navigation performance of the navigation aid are collected as users (commercial vehicles) pass through the service volume. Because of the large sample size (i.e., the increasing number of vehicles) that pass through the service volume, the performance of the navigation aid can be determined statistically to the same or better quality as using flight inspection aircraft for significantly lower costs. The embodiments described herein assess the dispersion of errors in the navigation due to the larger statistical data set in an effective manner. Further, the embodiments described herein for inspection of navigation aid are more efficient in detection of any anomalies in a timely manner since the data can be collected in real-time instead of through periodic inspection.

FIG. 1 illustrates a system 100 for inspection of a navigation aid. System 100 includes a plurality of vehicles 150-1 to 150-$n$ and at least one navigation aid 140, wherein vehicles (generally referenced by 150) are in communication with navigation aid 140. In an exemplary embodiment, vehicles 150 are aircrafts. In further exemplary embodiments, vehicles 150 are commercial aircrafts. Using commercial aircrafts ensures that the operation traffic is not disrupted.

In an exemplary embodiment, navigation aid 140 includes, but is not limited to, Instrument Landing Systems (ILS), Distance Measuring Equipment (DME), Very High Frequency Omni-direction Range (VOR), Global Positioning System (GPS) and/or other navigational aid provided by a Navigation Service Provider (NSP). In an exemplary embodiment, at least one of the plurality of vehicles 150-1 to 150-$n$ is a commercial vehicle. Vehicles 150-1 to 150-$n$ include navigation sensors 155-1 to 155-$n$ respectively. Navigation sensors (generally referenced by 155) are configured to receive signals from navigation aid(s) 140. The navigation signals received can be used by the sensor to generate navigation data determining measurement of at least one parameter. For example, the signals received from navigation aid(s) 140 are used by vehicle 150 for navigational purposes such as determining position, warning the vehicle of dangers or obstruction in the vehicle's path, assisting vehicle 150 in determining a safe course, or any other navigational purpose.

Navigation sensors 155 are configured to determine the measurements relating to at least one parameter based on the signals received from the navigation aid. After determination of the measurements, the data from sensors 155 is communicated to a data center 180 via a communication link 160. In an exemplary embodiment, communication link 160 may be at least one of a satellite communication (Satcom), radio link communication, datalink communication and wireless avionics intra-communication (WAIC). In an exemplary embodiment, datalink communication includes aircraft communications addressing and reporting system (ACARS)). In an exemplary embodiment, the data from sensors 155 is stored in a memory of vehicle 150 itself to upload at a later time. In an exemplary embodiment, the navigation data from sensors 155 is transmitted to data center 180 in real time.

Data center 180 comprises a processor 170 and a memory 175. In an exemplary embodiment, data center 180 is a ground station. In an exemplary embodiment, data center 180 comprises a cloud storage. Processor 170 is configured to execute algorithm 178. Algorithm 178 is executed to analyze the data received from sensors 155 and assess the performance of navigation aid(s) 140. In an exemplary embodiment, algorithm 178 performs a statistical analysis on the data received from sensor(s) 155. Further, execution of algorithm 178 also comprises determining accuracy of the navigation aid 140 based on the analyzed navigation data. In an exemplary embodiment, accuracy of the navigation aid 140 is determined dynamically as additional navigation data is received. In an exemplary embodiment, accuracy of the navigation aid 140 is determined in real time.

In an exemplary embodiment, data center 180 comprises memory 175 coupled to processor 170. In an exemplary embodiment, data received by data center 180 is saved in memory 175. In an exemplary embodiment, memory 175 stores input data received by the data center 180 until the data is to be analyzed using algorithm 178.

In various alternative embodiments, system elements, method steps, or examples described throughout this disclosure (such as the processor 170 and/or sub-parts thereof, for example) may be implemented using one or more computer systems, field programmable gate arrays (FPGAs), analog systems, or similar devices and/or comprising a processor coupled to a memory and executing code to realize those elements, processes, steps or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL). Processor 170 can be an analog processor or a digital processor.

In an exemplary embodiment, the analysis of navigation data received from the navigation aid 140 may determine a technical shift in the navigation aid. For example, the measurements received from most or all of the vehicles 150 could be shifted by 2 degrees to N compared to where the measurements should be. Accordingly, the analysis determines a technical shift in the navigation aid 140 and the navigation aid 140 can then be calibrated to correct the shift.

Navigation aid 140 is then calibrated based on the determined accuracy of the navigation aid. For example, an ILS is functioning properly to a degree 1 sigma when the alignment error measures within a 0.01 under Category III, 0.02 under Category II and 0.03 under Category I (See FIG. 3). In such an example, the navigation aid 140 may be calibrated when the alignment error measures beyond the set threshold (such as, 0.01 under Category III, 0.02 under Category II and 0.03 under Category I). Accordingly, in an exemplary embodiment, when the determined accuracy of the navigation aid is beyond set threshold the navigation aid 140 is calibrated based on the determined accuracy.

In an exemplary embodiment, the analyzed data and/or assessment of the performance of the navigation aid 140 is sent to the NSP 190 and the navigation aid 140 is calibrated by the NSP 190. In an exemplary embodiment, navigation aid 140 is calibrated in real time.

Further, parameter measured by the navigation aid 140 (such as location data) can independently be measured using different equipment. This independently measured parameter can then be compared with the measurement(s) based on the navigation aid 140 to determine whether the navigation aid 140 is performing accurately. For example, ground equipment 156 (such as, surveillance radars or ground automatic dependent surveillance-broadcast (ADS-B)) provides respective parameter data to the data center 180 independent of navigation aid 140. The ADS-B constantly outputs a position of an aircraft 150. Accordingly, the measurement of the parameter via ADS-B can be compared with the measurement determined using navigation aid 140 to determine if navigation aid 140 is accurate.

In an exemplary embodiment, the navigation data relating to navigation aid 140 relates to a comparison of the parameter provided by the navigation aid 140 with a parameter determined from a second navigation system. The second navigation system is different from navigation system 100. That is, if the navigation aid 140 is an ILS and the parameter measured by the ILS is location data, the location data can independently be performed by a second navigation system such as a GPS that provides location data.

Further, data center 180 can be configured to perform analysis and/or determine the accuracy of the navigation aid 140 at pre-determined interval, wherein each interval includes a different sample size. For example, analysis of navigation data and determination of accuracy of the navigation aid can be performed hourly. In an exemplary embodiment, the analysis of navigation data and determination of accuracy of the navigation aid can be performed daily. In further exemplary embodiments, the analysis of navigation data and determination of accuracy of the navigation aid can be performed at a greater interval with more samples by receiving navigation data from a greater plurality of vehicles. In an exemplary embodiment, the assessment of navigation aid is performed by determining an average of the measurement of the parameters.

In an exemplary embodiment, the collection of navigation data by data center 180 is used to extend the formal calibration time by a flight inspection vehicle. In some exemplary conventional systems, a formal flight inspection by a flight inspection vehicle is performed every six months. The collection of navigation data by plurality of vehicles 150-1 to 150-n can be used to determine the time at which a formal flight inspection is to be performed. For example, the data center 180 may determine that the navigation aid 140 has taken a jump but calibration of the navigation aid 140 using the navigation data received from the plurality of vehicles 150 may not be possible. In such an example, a formal flight inspection to calibrate the system may be performed even when the time period between formal flight inspection is increased.

Figure 2:
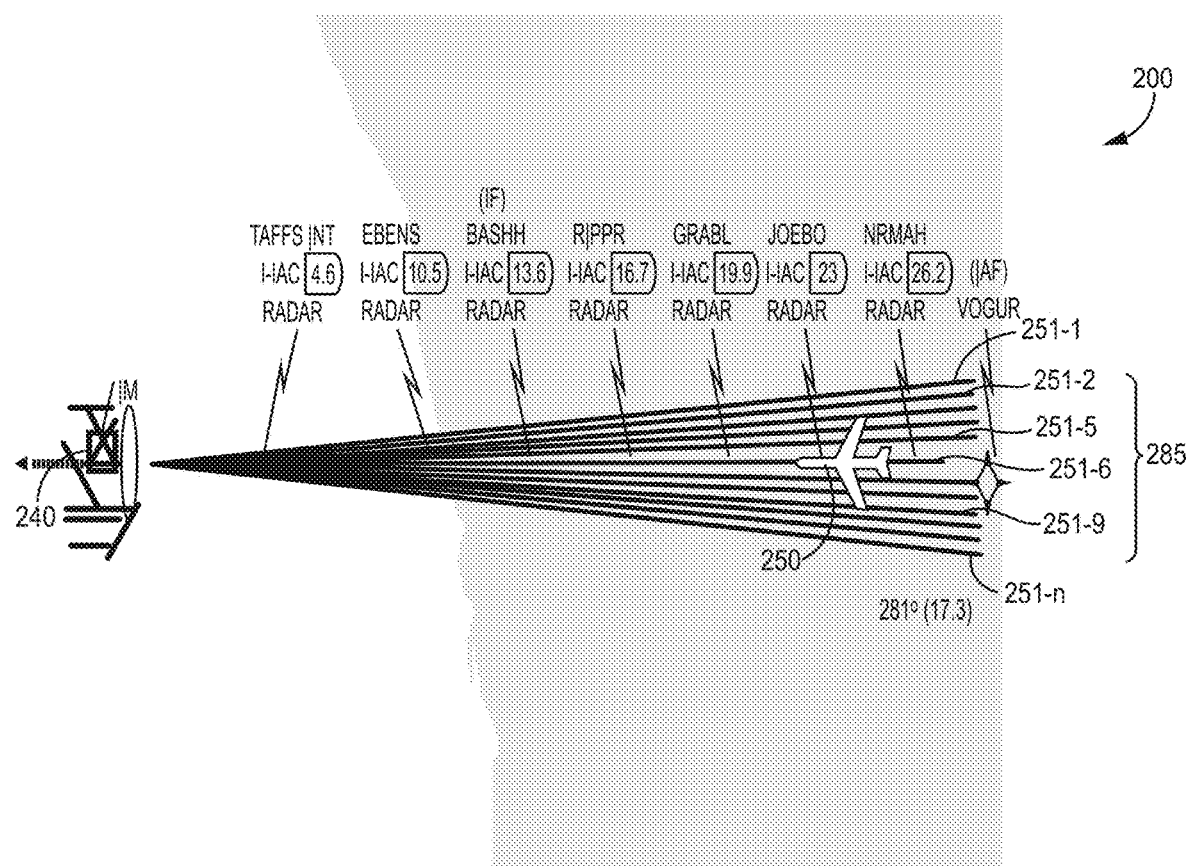
FIG. 2 illustrates one example of a system for inspection of a navigation aid according to the embodiments described herein.

FIG. 2 illustrates one example of inspection of a navigation aid in system 200. In the example shown in FIG. 2, the inspected navigation aid is an instrument landing system (ILS) localizer 240. As shown in FIG. 2, aircraft(s) 250 are continuously arriving at an airport. In the example shown in FIG. 2, the aircrafts 250 are at O'Hare International Airport (ORD). As seen in FIG. 2, the aircrafts arriving at ORD fly in using different routes 251-1 to 251-n. Accordingly, plurality of aircraft(s) 250 are able to cover the entire service volume 285 of ILS localizer 240.

Figure 3:
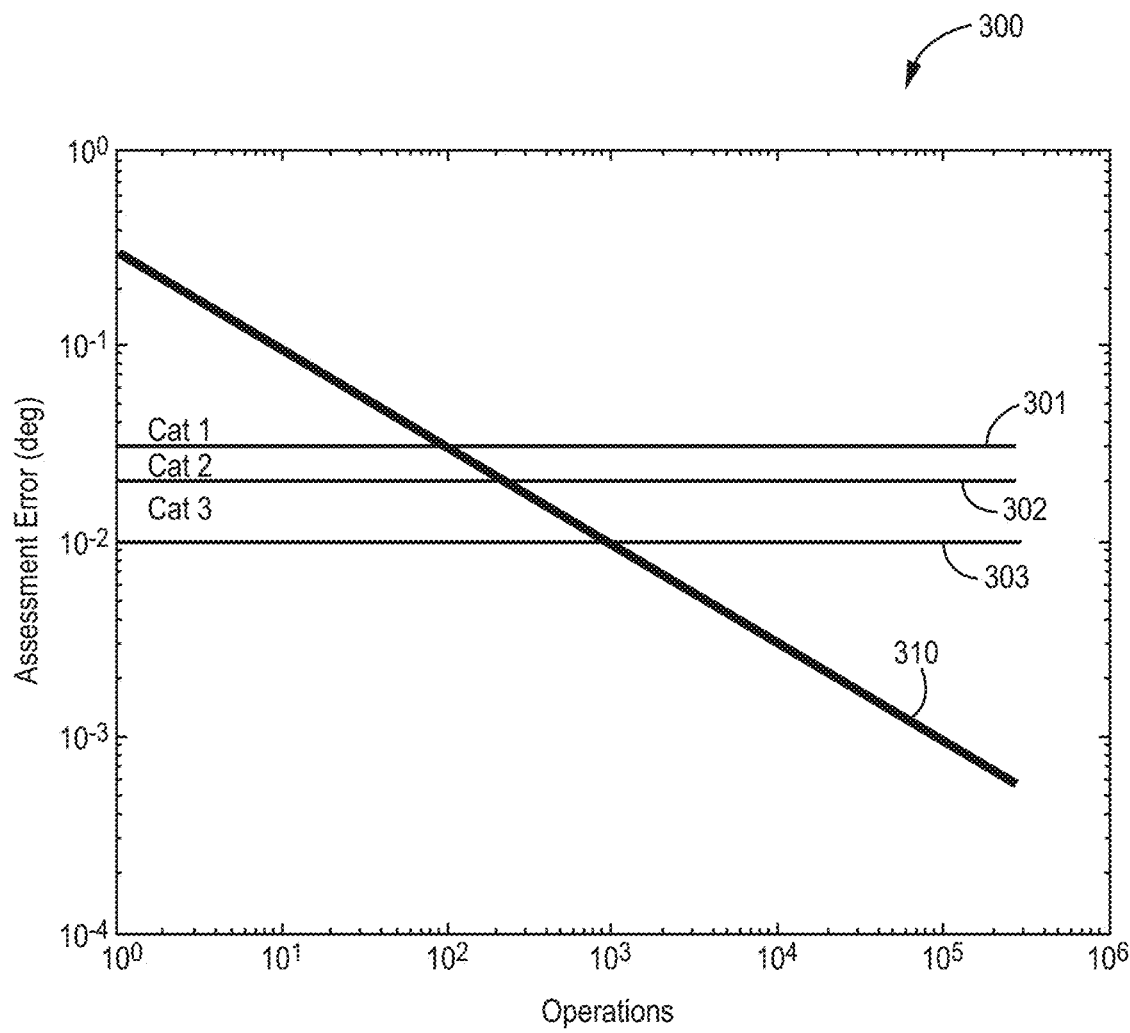
FIG. 3 illustrates a graphical representation of operation of exemplary systems discussed in FIGS. 1 and 2 according the embodiments described herein.

FIG. 3 illustrates a graphical representation 300 of methods and systems described herein. Line 310 shows the correlation between the number of operations and the error in the assessment of the navigation aid based on the data obtained from those operations. As shown in FIG. 3, the error in the assessment of navigation aid decreases as the number of operations increase. As shown in FIG. 3, ILS are rated at Category 1 (301), Category 2 (302) and Category 3 (303) and get increasingly precise as the number of operations increase. For example, under Cat 1, the assessment is a good estimate at 100 operations. Under Cat 3, the assessment is met at more than 1000 operations. Under Cat 3, the alignment error is 0.01, which is similar to the accuracy achieved under conventional systems that use expensive equipment and specially trained personnel.

Figure 4:
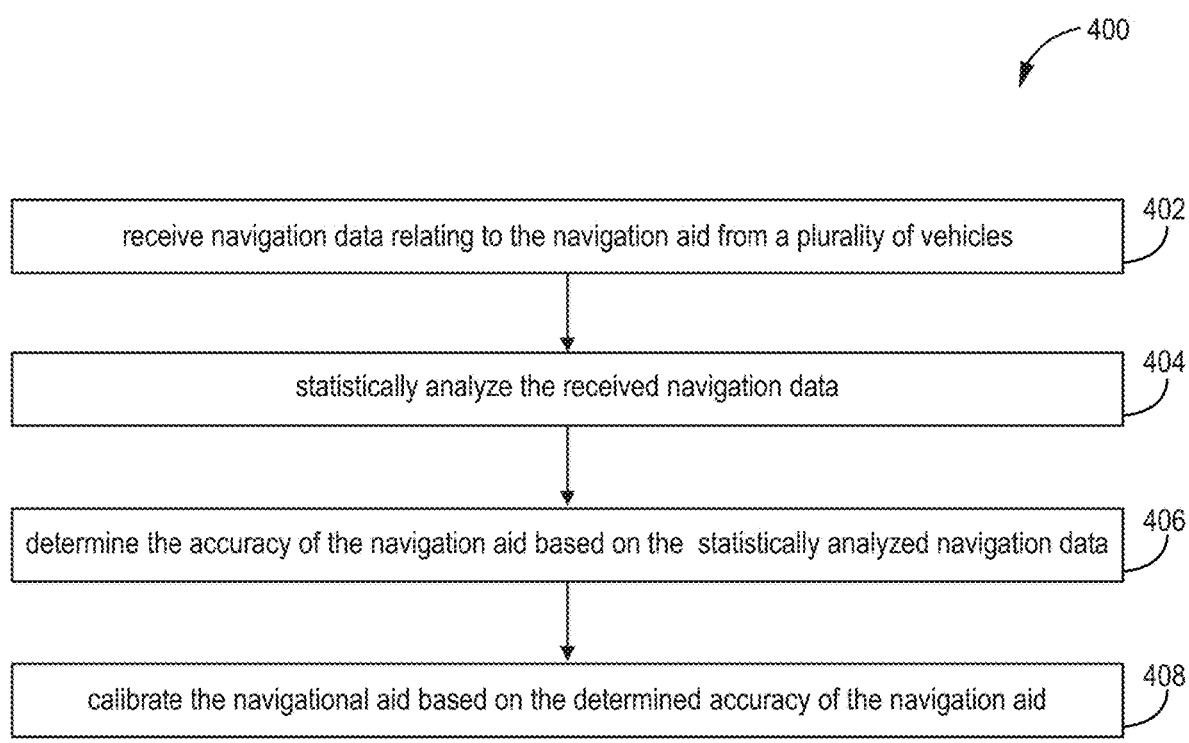
FIG. 4 illustrates a flow diagram for an exemplary method for inspecting a navigation aid.

FIG. 4 is a flow diagram of an example method 400 of inspecting a navigation aid, such as navigation aid 100. It should be understood that method 400 may be implemented in conjunction with any of the various embodiments and implementations described in this disclosure above or below. As such, elements of method 400 may be used in conjunction with, in combination with, or substituted for elements of those embodiments. Further, the functions, structures and other description of elements for such embodiments described herein may apply to like named elements of method 400 and vice versa. Further, the example flow diagram is provided as an ordered sequence of steps. Other sequences are possible. Hence, embodiments are not limited the order of sequence provided in FIG. 4.

Example method 400 begins at step (402) with receiving navigation data relating to the navigation aid from a plurality of vehicles. In an exemplary embodiment, method 400 comprises requesting the plurality of vehicles generate and send the navigation data relating to the navigation aid. In an exemplary embodiment, method 400 comprises requesting navigation data from secondary radars and/or other ground based facilities which may be used for comparison. For example, the secondary data can come from aircraft (via radar, GPS systems, etc.) or via ground systems.

The navigation data is received via communication links. In an exemplary embodiment, the communication link is at least one of satellite communication, radio link communication, datalink communication or wireless communication.

Method 400 proceed to step (404) with statistically analyzing the received navigation data. In an exemplary embodiment, the received navigation data relating to the navigation aid relates to a location data provided by the navigation aid. In an exemplary embodiment, analyzing the navigation further comprises analyzing navigation data received from a second different navigation system and comparing the navigation data from the two different navigation systems.

Method 400 then proceed to step (406) with determining the accuracy of the navigation aid based on the statistically analyzed navigation data. In an exemplary embodiment, the determination of the accuracy is done dynamically as additional navigation data is received. In an exemplary embodiment, the determination of the accuracy is done in real-time.

Method 400 finally proceeds to step (408) with calibrating the navigational aid based on the determined accuracy of the navigation aid. In an exemplary embodiment, the determination of the accuracy is sent to a navigation service provider to calibrate the respective navigation aid. In an exemplary embodiment, the navigation service provider is at least one of an airport, airline, or an independent navigation aid provider. In exemplary embodiments, calibrating the navigational aid based on the determined accuracy of the navigation aid further comprises extending time for formal inspection of the navigation aid, formally inspecting the navigation aid using a flight inspection vehicle, and calibrating the navigational aid based on the formal inspection by the flight inspection vehicle.

In accordance with common practice, the various described features are not drawn to scale but are drawn to emphasize specific features relevant to the exemplary embodiments.

EXEMPLARY EMBODIMENTS

Example 1 includes a method of inspecting a navigation aid, the method comprising: receiving navigation data relating to the navigation aid from a plurality of vehicles, wherein the navigation data includes measurement of at least one parameter; statistically analyzing the received navigation data; determining the accuracy of the navigation aid based on the statistically analyzed navigation data; and calibrating the navigational aid based on the determined accuracy of the navigation aid.

Example 2 includes the method of Example 1, further comprising: requesting the plurality of vehicles generate and send the navigation data relating to the navigation aid.

Example 3 includes the method of any of Examples 1-2, wherein the plurality of vehicles are commercial aircrafts.

Example 4 includes the method of any of Examples 1-3, wherein the at least one parameter is location data.

Example 5 includes the method of any of Examples 1-4, wherein the determination of the accuracy is done dynamically as additional navigation data is received.

Example 6 includes the method of any of Examples 1-5, wherein the determination of the accuracy is done in real-time.

Example 7 includes the method of any of Examples 1-6, wherein the navigation aid comprises at least one of an Instrument Landing System (ILS), a Distance Measuring Equipment (DME), a Very High Frequency Omni-direction Range (VOR) and a Global Positioning System (GPS).

Example 8 includes the method of any of Examples 1-7, wherein determining the accuracy of the navigation aid based on the statistically analyzed navigation data further comprises: receiving measurements of the at least one parameter from a second independent navigation system, wherein the second navigation system is unrelated to the navigation aid; and comparing the measurements of the at least one parameter received from the second independent navigation system to the navigation data relating to the navigation aid received from the plurality of vehicles.

Example 9 includes the method of any of Examples 1-8, wherein the second navigation system is an automatic dependent surveillance-broadcast (ADS-B).

Example 10 includes the method of any of Examples 1-9, wherein receiving navigation data relating to the navigation aid from a plurality of vehicles further comprises receiving navigation data via a communication link, wherein the communication link includes at least one of a satellite communication, radio communication, aircraft communication addressing and reporting system (ACARS), wireless avionics intra communication (WAIC) and datalink communication.

Example 11 includes the method of any of Examples 1-10, wherein calibrating the navigational aid based on the determined accuracy of the navigation aid further comprises: extending time for formal inspection of the navigation aid; formally inspecting the navigation aid using a flight inspection vehicle; and calibrating the navigational aid based on the formal inspection by the flight inspection vehicle.

Example 12 includes a navigation aid inspection system comprising: a data center in communication with at least one communication link to receive navigation data relating to the navigation aid from a plurality of vehicles, the data center including: at least one memory to store at least operating instructions and navigation data received from the plurality of vehicles, at least one processor configured to execute the operating instructions to: statistically analyze the received navigation data; determine the accuracy of the navigation aid based on the statistically analyzed navigation data; and cause a calibration of the navigation aid when the determined accuracy of the navigation aid is beyond a set threshold to achieve a desired accuracy.

Example 13 includes the system of example 12, wherein the at least one communication link is at least one of a satellite communication, radio communication, datalink communication and wireless avionics intra communication (WAIC).

Example 14 includes the system of any of Examples 12-13, wherein the data center comprises at least one of a ground station and a cloud storage unit.

Example 15 includes the system of any of Examples 12-14, wherein the processor is configured to determine the accuracy of the navigation aid in real-time.

Example 16 includes the system of any of Examples 12-15, wherein the navigation aid comprises at least one of an Instrument Landing System (ILS), a Distance Measuring Equipment (DME), a Very High Frequency Omni-direction Range (VOR) and a Global Positioning System (GPS).

Example 17 includes the system of any of the Examples 12-16, wherein the processor configured to determine the accuracy of the navigation based on the statistically analyzed navigation data further comprises: receive measurements of at least one parameter from a second independent navigation system, wherein the second navigation system is unrelated to the navigation aid; and compare the measurements of the at least one parameter received from the second independent navigation system to the navigation data relating to the navigation aid received from the plurality of vehicles.

Example 18 includes the system of any of the Examples 12-17, wherein the at least one parameter is location data.

Example 19 includes non-transitory computer readable medium storing a program having instructions stored thereon, executable by a processor, to perform a method for inspection of a navigation aid, the method comprising: receiving navigation data relating to the navigation aid from a plurality of vehicles, wherein the navigation data includes measurement of at least one parameter; statistically analyzing the received navigation data; determining the accuracy of the navigation aid based on the statistically analyzed navigation data; and calibrating the navigational aid based on the determined accuracy of the navigation aid.

Example 20 includes the non-transitory computer readable medium of claim 19, wherein determining the accuracy of the navigation aid based on the statistically analyzed navigation data further comprises: receiving measurements of the at least one parameter from a second independent navigation system, wherein the second navigation system is unrelated to the navigation aid; and comparing the measurements of the at least one parameter received from the second independent navigation system to the navigation data relating to the navigation aid received from the plurality of vehicles.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method of inspecting a navigation aid, the method comprising:

receiving navigation data relating to the navigation aid from a plurality of vehicles, wherein the navigation data includes measurement of at least one parameter;

statistically analyzing the received navigation data;

determining the accuracy of the navigation aid based on the statistically analyzed navigation data; and calibrating the navigational aid based on the determined accuracy of the navigation aid.

2. The method of claim 1, further comprising:

requesting the plurality of vehicles generate and send the navigation data relating to the navigation aid.

3. The method of claim 2, wherein the plurality of vehicles are commercial aircrafts.

4. The method of claim 1, wherein the at least one parameter is location data.

5. The method of claim 1, wherein the determination of the accuracy is done dynamically as additional navigation data is received.

6. The method of claim 1, wherein the determination of the accuracy is done in real-time.

7. The method of claim 1, wherein the navigation aid comprises at least one of an Instrument Landing System (ILS), a Distance Measuring Equipment (DME), a Very High Frequency Omni-direction Range (VOR) and a Global Positioning System (GPS).

8. The method of claim 1, wherein determining the accuracy of the navigation aid based on the statistically analyzed navigation data further comprises:

receiving measurements of the at least one parameter from a second independent navigation system, wherein the second navigation system is unrelated to the navigation aid; and comparing the measurements of the at least one parameter received from the second independent navigation system to the navigation data relating to the navigation aid received from the plurality of vehicles.

9. The method of claim 8, wherein the second navigation system is an automatic dependent surveillance-broadcast (ADS-B).

10. The method of claim 1, wherein receiving navigation data relating to the navigation aid from a plurality of vehicles further comprises receiving navigation data via a communication link, wherein the communication link includes at least one of a satellite communication, radio communication, aircraft communication addressing and reporting system (ACARS), wireless avionics intra communication (WAIC) and datalink communication.

11. The method of claim 1, wherein calibrating the navigational aid based on the determined accuracy of the navigation aid further comprises:

extending time for formal inspection of the navigation aid;

formally inspecting the navigation aid using a flight inspection vehicle; and calibrating the navigational aid based on the formal inspection by the flight inspection vehicle.

12. A navigation aid inspection system comprising:

a data center in communication with at least one communication link to receive navigation data relating to the navigation aid from a plurality of vehicles, the data center including:

at least one memory to store at least operating instructions and navigation data received from the plurality of vehicles, at least one processor configured to execute the operating instructions to:

statistically analyze the received navigation data;

determine the accuracy of the navigation aid based on the statistically analyzed navigation data; and cause a calibration of the navigation aid when the determined accuracy of the navigation aid is beyond a set threshold to achieve a desired accuracy.

13. The navigation aid inspection system of claim 12, wherein the at least one communication link is at least one of a satellite communication, radio communication, datalink communication and wireless avionics intra communication (WAIC).

14. The navigation aid inspection system of claim 12, wherein the data center comprises at least one of a ground station and a cloud storage unit.

15. The navigation aid inspection system of claim 12, wherein the processor is configured to determine the accuracy of the navigation aid in real-time.

16. The navigation aid inspection system of claim 12, wherein the navigation aid comprises at least one of an Instrument Landing System (ILS), a Distance Measuring Equipment (DME), a Very High Frequency Omni-direction Range (VOR) and a Global Positioning System (GPS).

17. The navigation aid inspection system of claim 12, wherein the processor configured to determine the accuracy of the navigation based on the statistically analyzed navigation data further comprises:

receive measurements of at least one parameter from a second independent navigation system, wherein the second navigation system is unrelated to the navigation aid; and compare the measurements of the at least one parameter received from the second independent navigation system to the navigation data relating to the navigation aid received from the plurality of vehicles.

18. The navigation aid inspection system of claim 17, wherein the at least one parameter is location data.

19. A non-transitory computer readable medium storing a program having instructions stored thereon, executable by a processor, to perform a method for inspection of a navigation aid, the method comprising:

receiving navigation data relating to the navigation aid from a plurality of vehicles, wherein the navigation data includes measurement of at least one parameter;

statistically analyzing the received navigation data;

determining the accuracy of the navigation aid based on the statistically analyzed navigation data; and calibrating the navigational aid based on the determined accuracy of the navigation aid.

20. The non-transitory computer readable medium of claim 19, wherein determining the accuracy of the navigation aid based on the statistically analyzed navigation data further comprises:

receiving measurements of the at least one parameter from a second independent navigation system, wherein the second navigation system is unrelated to the navigation aid; and comparing the measurements of the at least one parameter received from the second independent navigation system to the navigation data relating to the navigation aid received from the plurality of vehicles.

* * * * *